Sept. 25, 1928.

W. P. PORTER 1,685,376

TIRE VALVE

Filed Sept. 22, 1927

Inventor
Winfield P. Porter
By his Attorneys

Patented Sept. 25, 1928.

1,685,376

UNITED STATES PATENT OFFICE.

WINFIELD P. PORTER, OF GREENE, MAINE.

TIRE VALVE.

Application filed September 22, 1927. Serial No. 221,155.

The invention relates to a tire valve of the type wherein the pressure acts positively on the valve so as to aid in holding the latter tightly in closed position and aims to provide a valve of the above type which will be simple in construction, reliable in operation and easily assembled. Further objects and advantages of the invention will be in part obvious and in part specifically referred to in the description hereinafter contained which, taken in conjunction with the accompanying drawings, discloses a preferred embodiment thereof; such embodiment, however, is to be considered merely as illustrative of its principles. In the drawings:—

The invention is disclosed as applied to a valve structure comprising a valve shell 1 which may be of the usual type, and having a base 2 adapted to be received within an inner tube 3.

Figure 1:
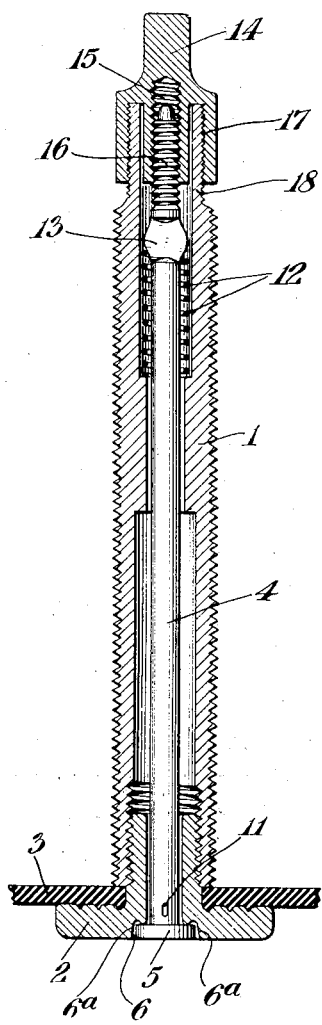
Figure 1 is a central longitudinal section of a tire valve constructed in accordance with the invention.
Figure 2:
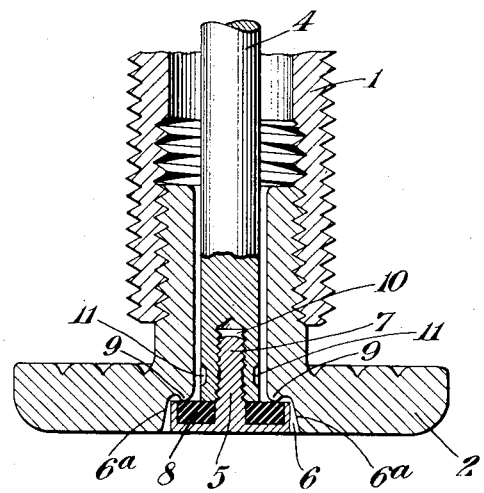
Figure 2 is a similar view showing on a larger scale the valve-head and associated parts.

A valve plunger 4 is slidable fairly loosely within the shell 1 and provided at its inner end with a head 5 which latter is received within a recess 6 (Fig. 2) when the valve is in closed position. Thus, if the tube becomes "flat", the valve-head 5 will not project toward the opposite wall of the tube so as to injure the tube or the valve.

The valve-head 5 is attached to plunger 4 by means of a stud 7 (Fig. 2) and a sealing ring 8 of rubber or similar composition, is clamped between the head 5 and the end of plunger 4 in position to bear against an annular lip 9 in recess 6 when the valve is closed. As shown, the stud 7 is threaded and fits within a threaded hole 10 in plunger 4, the inner end of the plunger being preferably distorted, as indicated by the detents 11, after stud 7 is screwed home, to lock the latter in position.

The side walls 6ᵃ of recess 6 preferably taper so as to guide the head 5 or sealing ring 8 always into approximately the same position of engagement with lip 9.

The plunger 4 is preferably pressed toward closed position by a spring 12 received within the shell 1 and acting against an enlargement 13 on the plunger, which enlargement preferably is formed integrally therewith, as by flattening out a section of the plunger.

The above combination of parts permits the valve structure to be assembled by first sliding the spring 12 along the plunger until it engages the shoulder or enlargement 13 thereon, the head 5 being detached at the time, then pushing the plunger 4 through the valve shell from the outer end until the hole 10 is accessible from the inner end of the shell, and finally screwing the head 5 in position until the sealing ring 8 is compressed between the valve-head and the end of the plunger.

I prefer also to hold the valve positively in closed position by means of a cap 14 having a threaded hole 15 engaging screw threads 16 on the outer end of the valve plunger. The cap 14 is also preferably provided with a device for locking it against accidental loosening. As shown, this cap is provided with threads 17 engaging the threaded end 18 of the valve shell, these threads being of a different pitch than the thread 16 previously described whereby the two sets of threads act somewhat in the manner of a lock-nut. I prefer also to make the threads 17 of smaller pitch than the threads 16, so as to obtain a differential action in screwing down the cap, and prevent the cap from pulling the plunger so far as to injure the engaging threads on the plunger and cap.

While a preferred embodiment of the invention has been described, it will be obvious that certain changes may be made therein without departing from its principles as set forth in the appended claims.

I claim:

1. A tire valve including a shell, having a base member which latter has a recess in its outer face and an annular lip at the bottom of the recess, a valve plunger in the shell having a threaded bore in its lower end, a valve head receivable in the recess of said base member and having a stud threaded into said bore and an annular recess on its upper face, and a sealing ring in the recess clamped between the valve head and the lower end of the plunger and projecting beyond the periphery of the plunger and being engageable with said annular lip.

2. A tire valve including a shell having a base member formed with an opening, a valve plunger in the shell having a threaded bore in its lower end, a valve head having a stud threaded into said bore and a sealing ring surrounding said stud and seated on the inner face of the valve head and being clamped between the valve head and the lower end of the plunger and being engageable with the base member to seal the opening of the latter.

In testimony that I claim the foregoing, I have hereunto set my hand this 7th day of July, 1927.

WINFIELD P. PORTER.